United States Patent [19]

Eastman

[11] Patent Number: 4,610,344
[45] Date of Patent: Sep. 9, 1986

[54] FILLING ATTACHMENT FOR A FEED TUBE

[75] Inventor: Curtis R. Eastman, Elfros, Canada

[73] Assignee: Lagrison Industries Ltd., Winipeg, Canada

[21] Appl. No.: 616,063

[22] Filed: Jun. 1, 1984

[30] Foreign Application Priority Data

Mar. 26, 1984 [CA] Canada .................................. 450483

[51] Int. Cl.⁴ ...................... B65G 11/14; B65G 33/08
[52] U.S. Cl. .......................................... 193/5; 193/15; 193/25 E; 198/538; 198/671; 414/787
[58] Field of Search .......... 198/671, 538, 860.1–860.5, 198/866; 193/15, 25 E, 5; 138/120; 414/787

[56] References Cited

U.S. PATENT DOCUMENTS

| | | | |
|---|---|---|---|
| 931,054 | 8/1909 | Gardner | 198/671 X |
| 2,467,682 | 4/1949 | Megargee | 198/671 X |
| 2,772,764 | 12/1956 | McClellan | 198/671 X |
| 3,080,960 | 3/1963 | Rensch | 198/671 X |
| 3,866,950 | 2/1975 | Skoch et al. | 285/4 |
| 4,318,547 | 3/1982 | Ericson | 277/207 A |

Primary Examiner—Stephen Marcus
Assistant Examiner—Mark Thronson
Attorney, Agent, or Firm—Stanley G. Ade

[57] ABSTRACT

A filling attachment for an auger comprises a hollow body providing a tubular section which can surround the feed end of the auger and an open mouth section which extends away from the tubular section. A conduit in the form of a plurality of inter-engaging hollow tubular buckets includes a member for connection to the tailgate of a truck and arranged so that the lowermost bucket projects into the open mouth section of the hollow body. The buckets and the hollow body can be interconnected by strapping which cooperates with press studs on the outer surface of the bucket and the rim of the mouth section. The tubular section includes stepped cylindrical portions for cooperation with auger tubes of different diameter.

12 Claims, 2 Drawing Figures

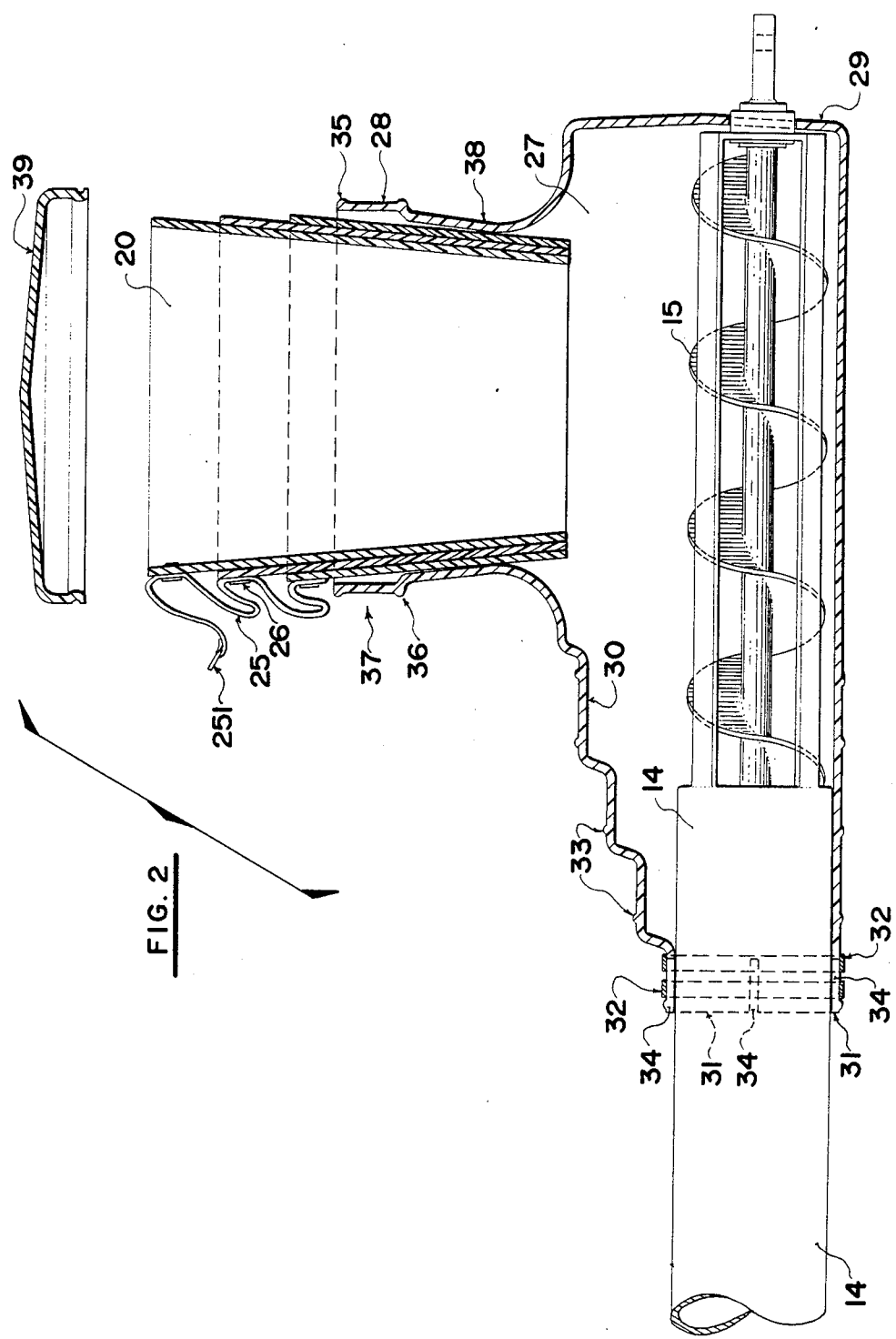

FILLING ATTACHMENT FOR A FEED TUBE

BACKGROUND OF THE INVENTION

This invention relates to a filling attachment for a feed tube of the type which can be coupled to, for example, the feed end of an auger for feeding particulate material to the screw of the auger.

It is a very common requirement that material, often grain, is dispensed from the rear tailgate of a truck box into the feed end of an auger. Generally, this is carried out by manoeuvering a bucket or hopper at the feed end of the auger to a position beneath the opening in the tailgate of the truck and then merely pouring the grain from the truck box into the hopper.

Obviously, this is unsatisfactory for many reasons. Firstly, there is a considerable safety risk in that the feed end of the auger flight is exposed and can be contacted by the operative. Secondly, there is a serious risk of spillage. Thirdly, the hopper for the auger is open to the elements and any other foreign material. Fourthly, dust emitted from the grain in the hopper is free to spread to the operative.

One way of overcoming this problem has been to attach an auger directly to the tailgate of the truck box which then remains permanently in position and is only infrequently used when the truck is unloaded. In many cases also, this does not overcome the problem of grain being discharged from the end of the auger into the hopper and therefore the hopper is open to release dust and to receive foreign material.

SUMMARY OF THE INVENTION

It is one object of the present invention, therefore, to provide an improved filling attachment for a feed tube which can be used to receive material from the tailgate of a truck box or other delivery system and to transmit it to the inlet end of the feed tube in a manner which is substantially enclosed.

According to the invention, therefore, there is provided a filling attachment for a feed tube comprising a substantially rigid hollow body separate from the tube and having a tubular section for surrounding a feed end of the tube, a collar for clamping around the tube and a tubular mouth section extending outwardly from the side of the tubular section and providing a rim around an open mouth for receiving and closely surrounding the discharge end of a discharge nozzle, the body when clamped by said coller, being closed apart from said open mouth so as to confine the material fed from said nozzle to enter the feed tube.

An attachment device of this type is particularly useful when used with a feed duct of the type formed by a plurality of tubular tapered buckets which are connected together with a narrower end of each inside the wider entry end of the next. In this way, the open mouth of the attachment is of substantially the same transverse dimension or diameter as the open end of one of the buckets so that the buckets and the open mouth form effectively an enclosed conduit or duct through which the material can pass.

The device can be used with an auger and auger flight or with any other form of delivery duct, for example, a vacuum tube.

Furthermore, the material in the truck box and in the duct passes directly down the duct into the open mouth and is confined by the tubular section to fall onto the auger flight to press material onto the auger flight and to ensure that it is fully filled to operate at capacity rather than in the usual less efficient manner.

Conveniently, the buckets can be interconnected by flexible strapping which is attached to the outer surface of each bucket.

It is a particular advantage of the invention that the material is properly fed to the feed tube or auger directly at the entry end despite movement of the delivery point caused by pivoting of a truck box to a raised position.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 2 is a cross sectional view of the attachment of FIG. 1 showing the auger tube and screw extending into the attachment, but with the buckets removed.

In the drawings like characters of reference indicate corresponding parts in the different figures.

DETAILED DESCRIPTION

Figure 1:
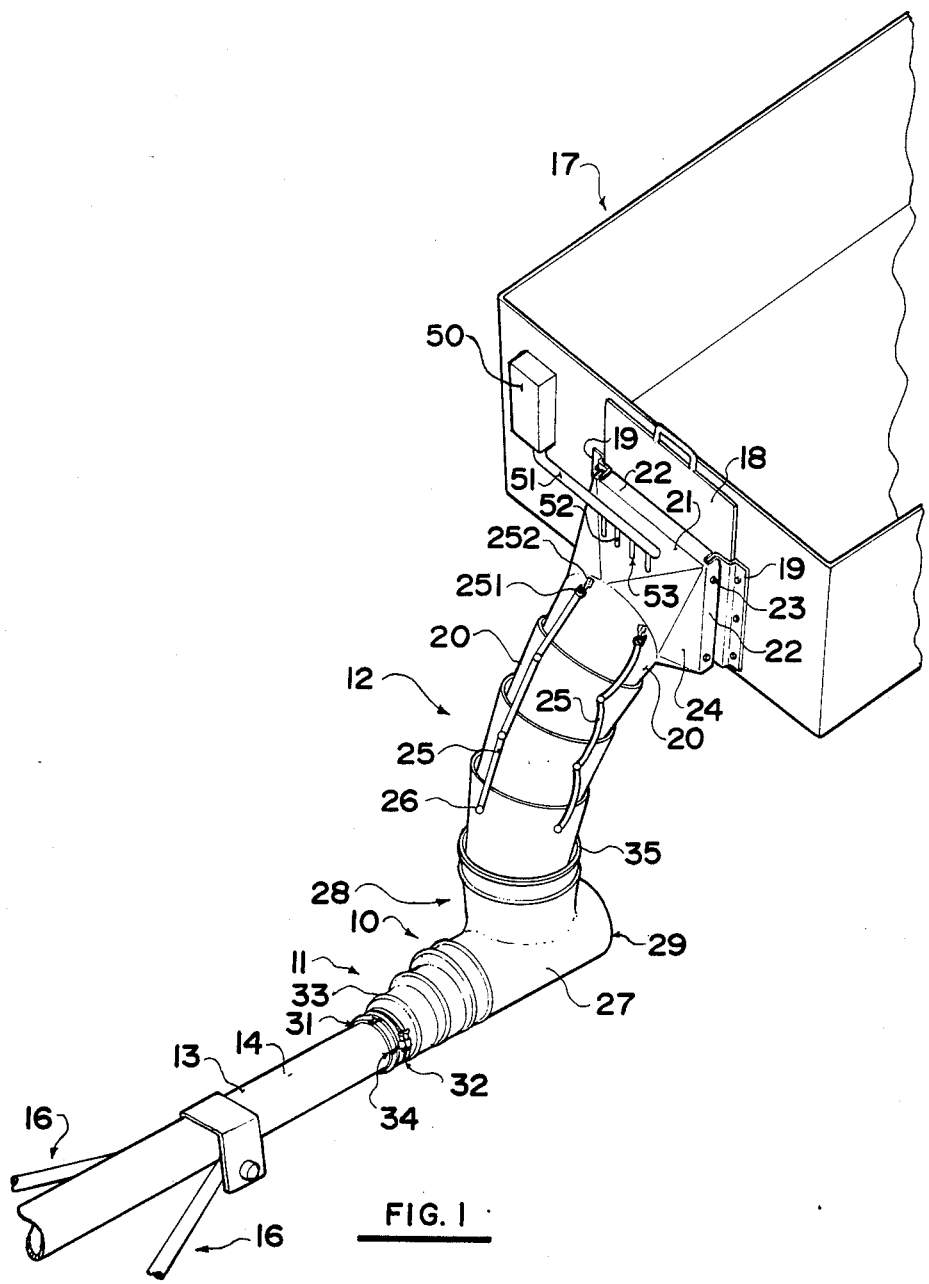
FIG. 1 is an isometric view of an attachment for the feed end of an auger receiving grain from the tailgate of a truck box.

The filling attachment is generally indicated at 10 and includes a boot portion 11 and a flexible conduit section generally indicated at 12.

The auger is indicated at 13 and is of conventional construction including an auger tube 14 and a flight 15 which, at a feed end of the tube 14 shown in FIG. 2, is exposed from the end of the tube to allow material to enter the tube and be carried along the tube by the flight. The tube can be supported on conventional mounting arrangements generally indicated at 16 for feeding the material to a suitable location, as is well known.

A truck box is generally indicated at 17 which has a conventional tailgate which covers an opening in the rear of the truck box and includes guides 19 which allow a slide 18 to be raised and lowered to allow material to escape from the truck box when it is raised in a conventional manner.

The flexible conduit 12 is formed from a number of individual tapered tubular buckets 20 formed from plastic material. Each bucket has a wider entry end of circular cross section and tapers downwardly to a narrower exit end again of circular cross section.

Three of the buckets as shown are formed from the simple tubular shape. A truck spout including a nozzle 201 is formed integrally with a rectangular base 21 for attachment to the tailgate. Again the nozzle 201 and base 21 are formed by moulding from plastics material.

The base 21 is formed with four flanges 22 projecting towards the tailgate with the side flanges being screwed by suitable couplings 23 to flanges on the tailgate. A lower flange indicated at 24 of the rectangular base can rest upon an outwardly projecting flange from the tailgate so the material leaving the tailgate passes directly into the rectangular base confined by the flanges 22 and 24.

The nozzle 201 attached integrally to the base 21 extends outwardly from the tailgate and is inclined outwardly and downwardly so the material leaving the tailgate directly enters the bucket 20 which projects outwardly in the form of a nozzle for containing the flow of material into the next adjacent bucket.

The buckets are interconnected by flexible strapping members 25 which in known manner can flex to allow the buckets to be inserted into one another so as to retract the conduit into a transport position.

The strapping members 25 are riveted to each bucket and carry at the top end, a spring latch 251 for releaseable attachment to a hook 252 on the top bucket.

The buckets are of the order of twelve inches in length and have a narrower diameter of the order of ten inches and a wider diameter at least two inches greater at about twelve inches. This angle of taper and difference in diameter allows the large degree of flexibility which is necessary to accommodate movement of the truck box in lifting to discharge the material.

The attachment or hook between the conduit and the auger tube indicated at 11 comprises a hollow body or member formed from plastics material including a tubular section 27 and a mouth section 28.

The tubular section 27 is of sufficient length to extend along the full length of the feed section of an auger tube so that with one end 29 of the tubular section which is closed against the end face of the auger tube, the other end 30 extends to a position beyond the commencement of the tube 14. As shown in FIG. 2, the auger tube and conventional cage lies at the bottom of the tubular section 27 in contact with the bottom surface of the tubular section and the tubular section surrounds and extends above the feed section of the auger tube.

In the embodiment shown, the auger tube is of relatively small cross section, for example, a five-inch auger tube. The tubular member 27 therefore includes collar 31 which is approximately five inches in diameter so that it can wrap around the auger tube and be clamped thereto by a pair of hose clamps 32 of conventional construction.

In order that the same auger boot can be used in conjuction with six-inch, seven-inch or eight-inch augers as well as the five-inch auger shown, there is provided a clamp section at the end of the tubular member 45 which is stepped in one-inch diameter steps up to the full eight-inch diameter of the tubular member 27 itself. It will be noted that the stepped section is formed from flexible plastics material with a substantially cylindrical portion which can be clamped to the auger of the desired dimension followed by a radial stepped portion which steps down to the next adjacent dimension.

Therefore, in order to accommodate the larger diameter auger tubes, the earlier sections are removed by cutting, leaving the required cylindrical or annular portion which can be clamped to the auger tube by hose clamps of the type similar to those illustrated at 32.

In order to maintain the lower surface of the tubular member 27 substantially horizontal, the step is provided in the upper wall so that the cylindrical portions are not co-axial, but the axis also similarly steps downwardly. Each of the cylindrical portions terminates in a ridge 33 which acts as a retaining ring to locate the hose clamps 32.

In manufacture, the stepped section can be formed with a closed end at the narrowest cylindrical portion and then can be cut at the desired point and slits 34 formed in the required cylindrical portion so that it can be readily slipped over the auger tube of the intended dimension.

It will be noted therefore that the diameter of the tubular section 27 is of the order of eight inches and it communicates smoothly with the mouth section which similarly is provided by a cylindrical wall with a vertical axis. The mouth section 28 communicates with the tubular section 27 mid-way along its length so that a stub portion is formed between the end 29 and the commencement of the mouth section. This generally positions the mouth section directly over the open feed area of the flight of the auger.

The open end of the mouth section 28 is provided with a number of stiffening ribs 35, 36 surrounding the open end which provide a rigid circular rim 37 surrounding the open end which retains the mouth section vertical and open for receiving the lower end of the lowermost bucket 20. Beneath the rim 37 is provided a slightly tapered section 38 which is similar to the taper of a bucket 20 so the bucket can slide into the open mouth and sit in contact with the tapered section 38. Thus, the buckets can be all slid into the open mouth to rest against section 38 in a concertinalike formation when not in use.

The tapered section however acts as a stop to prevent the buckets projecting into the tubular section sufficient to contact the auger flight. For this purpose, the lowermost bucket and the next adjacent bucket may be reduced in axial length to eight inches and ten inches respectively so that when contracted, they do not project beyond the end of the third bucket.

When pulled out of the open mouth for use, the lower end of the lowermost bucket can either sit in contact with the tapered section 38 or, if the buckets are fully extended, it can just project into the rim 37 sufficiently to ensure that grain is directed properly into the open mouth. There is a considerable degree of flexibility therefore available.

In order to provide a lid 39 for the mouth section, the rim 37 is manufactured integrally with a lid in a form not shown with a closed end which is then severed from the rim 37 by cutting along an indented line moulded on the part.

The boot 11 therefore is moulded as a closed, substantially rigid and separate part which can be sold in that form with the lid separated and used as shown on the mouth section and also the end closing the stepped section can be removed as required for use. The product can be simply manufactured as a single part which can then be cut to shape by the user, depending upon the equipment he has with which he intends to use the product.

When assembled, the attachment device 11 remains attached to the auger or other feed tube and the flexible conduit provided by the buckets is separate for attachment to the truck box. The conduit provides a very flexible arrangement which allows it to accommodate misalignment of the truck box and the end of the auger tube and also to accommodate the movement which is necessary as the truck box lifts to discharge the material.

Although the arrangement has been described in relation to discharge of material from a truck box, it can also be used for discharge of material from any other source, for example, the outlet of a hopper bottom bin. In this case, the attachment of the conduit provided by the buckets may need to be modified to accommodate the different outlet from the supply, but these modifications will be apparent to one skilled in the art.

It will be noted that the tubular section is cylindrical and is of a diameter which is of the order of the size of the auger tube with which it is to cooperate. Preferably, the diameter of the tubular section is merely sufficient to receive the cage of the feed end of the auger tube in which case it need be no more than five inches greater than the diameter of the auger tube and in many cases, very much less than that figure. In this way the material passing downwardly through the mouth section is directed onto the feed section of the auger and all the material at the feed section of the auger is confined around the feed section to be withdrawn from that area. There is no possibility of material being thrown out to the sides and little or none is left within the tubular section after feed is completed. Furthermore, the material effectively is confined against the auger flight from all directions and therefore efficiently feeds into the auger flight.

A further embodiment could be manufactured for use with larger diameter auger tubes where the smallest step is eight inches and the steps increase in one-inch diameter up to twelve inches.

As shown in FIG. 1, the device lends itself particularly effectively to a seed treatment application where a supply of the seed treating liquid is indicated at 50 which is communicated through a main feed tube 51 and separate feed lines 52 to a plurality of nozzles 53 provided in the upper part of the rectangular section 24. Thus, the treatment liquid is added to the material as it leaves the truck box across a width of the discharge and then can be mixed into the material by the effect of the auger.

Since various modifications can be made in my invention as hereinabove described, and many apparently widely different embodiments of same made within the spirit and scope of the claims without departing from such spirit and scope, it is intended that all matter contained in the accompanaying specification shall be interpreted as illustrative only and not in a limiting sense.

I claim:

1. A filling attachment for confining material to be fed from a duct into a feed tube, the attachment comprising a substantially rigid hollow body separable from the tube and having a tubular section for surrounding a feed end of the tube, a collar for clamping around the tube and a tubular mouth section extending outwardly from one side of the tubular section, having an open mouth and providing a rim around said open mouth for receiving and closely surrounding the end of the duct, the body when clamped by said collar, being closed apart from said open mouth so as to confine the material fed from said duct to enter the feed tube, wherein the collar includes a plurality of cylindrical stepped collar portions, each portion being adapted for engaging and clamping around a tube of predetermined diameter and being reduced in diameter relative to the tubular section and relative to a next adjacent collar portion down to a smallest collar portion whereby the collar is adapted for attachment to a plurality of feed tubes of different diameters by the severing of one or more of said collar portions from said collar.

2. The attachment according to claim 1 wherein the mouth section includes a portion tapered in transverse dimension toward said tubular section.

3. The attachment according to claim 1 which is formed from plastics material in one piece.

4. The attachment according to claim 1 including a lid for the mouth section.

5. A filling system for confining material to be fed into a feed tube, said system comprising a duct, and a substantially rigid hollow body separate from the tube and having a tubular section for surrounding a feed end of the tube, a collar for clamping around the tube and a tubular mouth section extending outwardly from one side of the tubular section, having an open mouth and providing a rim around said open mouth for receiving and closely surrounding the end of the duct, the body when clamped by said collar, being closed apart from said open mouth so as to confine the material fed from said duct to enter the feed tube, said duct comprising a plurality of separate tapered tubular buckets each of which has a narrower end projecting into the wider end of a next adjacent bucket to form a flexible substantially closed conduit through which material can pass to said open mouth of the mouth section, the axial length of the lowermost bucket being less than that of the other buckets.

6. The system according to claim 5 comprising a rectangular base member, a nozzle integrally attached to said rectangular base member and means for attaching said rectangular base member to an outer frame of a tailgate of a truck box, the nozzle being shaped to project into a first of the buckets.

7. The system according to claim 5 wherein the diameter of the rim is substantially equal to the diameter of the larger end of one of the buckets.

8. The system according to claim 5 wherein the mouth section includes means for cooperating with a lowermost bucket to prevent entry of the bucket into said tubular section.

9. The system according to claim 8 wherein the cooperating means of the mouth section includes a portion thereof tapered in transverse dimension.

10. The system according to claim 5 wherein the axial dimension of the mouth section is sufficient to receive the majority of the axial length of a bucket.

11. The system according to claim 8 wherein the axial dimension of the mouth section is sufficient to receive the majority of the axial length of a bucket.

12. The system according to claim 5 wherein the buckets are tapered such that the narrower end is less in transverse dimensions than the larger end by a distance of the order of two inches.

* * * * *